US007673010B2

(12) United States Patent
Bennett

(10) Patent No.: US 7,673,010 B2
(45) Date of Patent: Mar. 2, 2010

(54) MULTI USER CLIENT TERMINALS OPERABLE TO SUPPORT NETWORK COMMUNICATIONS

(75) Inventor: James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 1071 days.

(21) Appl. No.: 11/341,833

(22) Filed: Jan. 27, 2006

(65) Prior Publication Data
US 2007/0180123 A1 Aug. 2, 2007

(51) Int. Cl.
*G06F 15/16* (2006.01)
(52) U.S. Cl. .................. 709/213; 709/227; 709/238; 709/249
(58) Field of Classification Search ............. 709/208, 709/224, 219, 206, 223, 220, 204; 705/75; 379/352, 342, 338, 336, 328, 310, 254, 221, 379/229, 221.14, 221.08, 221.01, 220.01, 379/211.01, 142.05, 142.01, 1.03; 455/558, 455/518, 456.5, 456.1, 453, 445, 442, 443, 455/70, 560, 552.1, 465, 462, 460, 446, 444, 455/441, 440, 437, 432.3, 428
See application file for complete search history.

(56) References Cited
U.S. PATENT DOCUMENTS
6,754,224 B1 * 6/2004 Murphy ............... 370/432

2002/0116461 A1 * 8/2002 Diacakis et al. ........... 709/204
2005/0125541 A1 * 6/2005 Frank et al. .............. 709/227
2007/0133525 A1 * 6/2007 McGary ................. 370/356

* cited by examiner

Primary Examiner—Quang N. Nguyen
Assistant Examiner—Charles Murphy
(74) Attorney, Agent, or Firm—Garlick Harrison & Markison; Bruce E. Garlick

(57) ABSTRACT

A network infrastructure operable to support the exchange of communications, such as voice communications, between a first client terminal having a first user identifier and a second (destination) client terminal associated with a second user identifier (handle). This second client terminal may be part of a family of client terminals. The network infrastructure includes a packet-switch network, a shared database and a number of client terminals serviced by one or more service providers. These terminals include a network interface and are identified by their service provider by a network address. The shared database associates user identifiers, metadata and network addresses. This allows a user to access the shared database in order to initiate a call request from the first client terminal to the second client terminal(s). The first client terminal receives the network address or vectoring information on the network address of the destination terminal through the shared database. This shared database may also have metadata used to manage the call. The destination terminal may receive or redirect the call within the family of client terminals based on metadata contained within the shared database or stored locally.

35 Claims, 14 Drawing Sheets

MULTI USER CLIENT TERMINALS OPERABLE TO SUPPORT NETWORK COMMUNICATIONS

TECHNICAL FIELD OF THE INVENTION

This invention relates generally to network based communications and more particularly to management of packet data communications between multiple client terminals that may be associated with multiple users.

BACKGROUND OF THE INVENTION

Communication technologies currently allow Internet or network based voice communications. Internet voice communications allow users to make telephone calls using a computer network or other data network. Internet voice communications convert a voice signal into a digital packetized signal that travels over the network to the destination terminal. These Internet-based communications may be made through a personal computer (PC) attached to the Internet or other like network, or a traditional telephone having an adaptor that allows the traditional telephone to interface and place phone calls over the network. Additionally, some devices may facilitate communications within multiple networks. For example, a single device may serve as a traditional phone, cell phone, and/or Internet phone. Such devices are typically shared in the home by multiple family members.

One such Internet Protocol (IP) enabled service is known as Voice over Internet protocol (VoIP). VoIP allows voice communications to be packetized and exchanged using a broadband Internet connection instead of an analog or a traditional phone line. However, these Internet voice services currently allow users to call only other users that utilize the same service provider or to users available through the public switched telephone network (PSTN). This limitation may be imposed by incompatible CODECs chosen to packetize the voice communications, network addressing issues or other like difficulties.

The Internet has also facilitated text messaging between two or more users, first with email, and now instant messaging (IM). Email communications do not require common service providers to be used by both the originating terminal and the destination terminal. An email address provides vectoring information to identify the communications intended destination and is made of several parts. The first part of the address is a username, identifier, or handle that identifies a unique user within a server. The ampersand (@) separates the username from the host name. The host name uniquely identifies the server computer network and is the second part of the email address. This host name may include a suffix that identifies the kind of organization operating the server such as .com, .edu, .gov, mil, etc. This format for an email address identifies a location to which an email can be delivered. Since network based communications often require IP addresses for the destination terminal, and these addresses frequently change, Internet-based voice communications currently lack this addressing ability.

IM is a form of electronic communication which involves immediate correspondence between two or more users of a common IM service who are online simultaneously. To access such functionality, each user downloads and installs the same IM service provider's support software on their personal computing device. When in operation, the software attempts to maintain with a central server of that IM service provider the current IP address of the underlying user's personal computing device. If two users have such software in operation, either may initiate a correspondence to the other by retrieving the IP address of the other from the central server. However, IM, unlike email, requires both of the users to employ the same software and central server, i.e., the same IM service provider. Popular instant messaging services supporting at least textual correspondence include AOL's Instant Messenger (AIM), Microsoft MSN Messenger and Yahoo Messenger, for example. Some recent versions of IM also support voice communications (correspondence) between these users.

Instead of assigning permanent IP addresses to an individual user or computing device, many Internet Service Providers (ISPs) assign temporary IP addresses using, for example, a dynamic host configuration protocol (DHCP). Using the DHCP protocol, an ISP's DHCP server allocates and reallocates a pool of IP addresses as client devices log in and out. Upon logging in, each client device request the assignment of an IP address. The DHCP server responds by assigning a currently unused IP address from its pool. When a client device logs out or otherwise disconnects from the network, the DHCP server is free to reallocate the IP address to another client device. DHCP servers also maintain a database that associates each client device with its currently assigned IP address. With such dynamic address allocation, a client device may have a different IP address every time the device connects to the network. Additionally, DHCP servers may also support a mix of static and dynamic IP addresses.

The IP addresses of most client devices frequently change; using a current IP address to permanently and uniquely identify each client device is not always possible. Thus, when a user of one client device desires to contact another, a service provider can assist if both sign up for that service provider's maintenance and sharing of current IP addresses, i.e., if both users become members. More specifically, a typical IM or VoIP service provider maintains a database on a central server. The database associates each member's "name identifier" with the current IP addresses of that member's client device(s). To maintain an accurate database, each client device delivers its underlying name identifier and current IP address to the central server for updating. The service provider then uses this database to route communications between devices. Only through such updating can a member reasonably expect to receive incoming service. When a communication is initiated from a user serviced by a different service provider, there is no access to addressing information. Thus, a user having a first service provider is unable to establish a connection or communication pathway to a destination terminal serviced by a second service provider.

Static IP addresses are also in use, but are less common for client devices because of their frequent network detachment for relatively long periods before reattaching. Therefore, a substantial percentage of such statically assigned IP addresses are not in use at any given time. Additionally, as devices change ISPs, even static IP addresses previously assigned will change.

As a number of users, such as family members within a home, may be associated with a number of devices and service providers, improved ways of handling incoming and outgoing communications between shared devices is required.

As previously stated, these network-based voice communication services lack the ability to service calls entirely within the network environment when the client terminals are serviced by different service providers. As the number of providers offering these services increase, improved ways of handling communications between service providers is required.

Further limitations and disadvantages of conventional and traditional IM and Internet voice systems and related functionality will become apparent to one of ordinary skill in the art through comparison with the present invention described herein.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the figures, like numerals being used to refer to like and corresponding parts of the various drawings.

Figure 1:
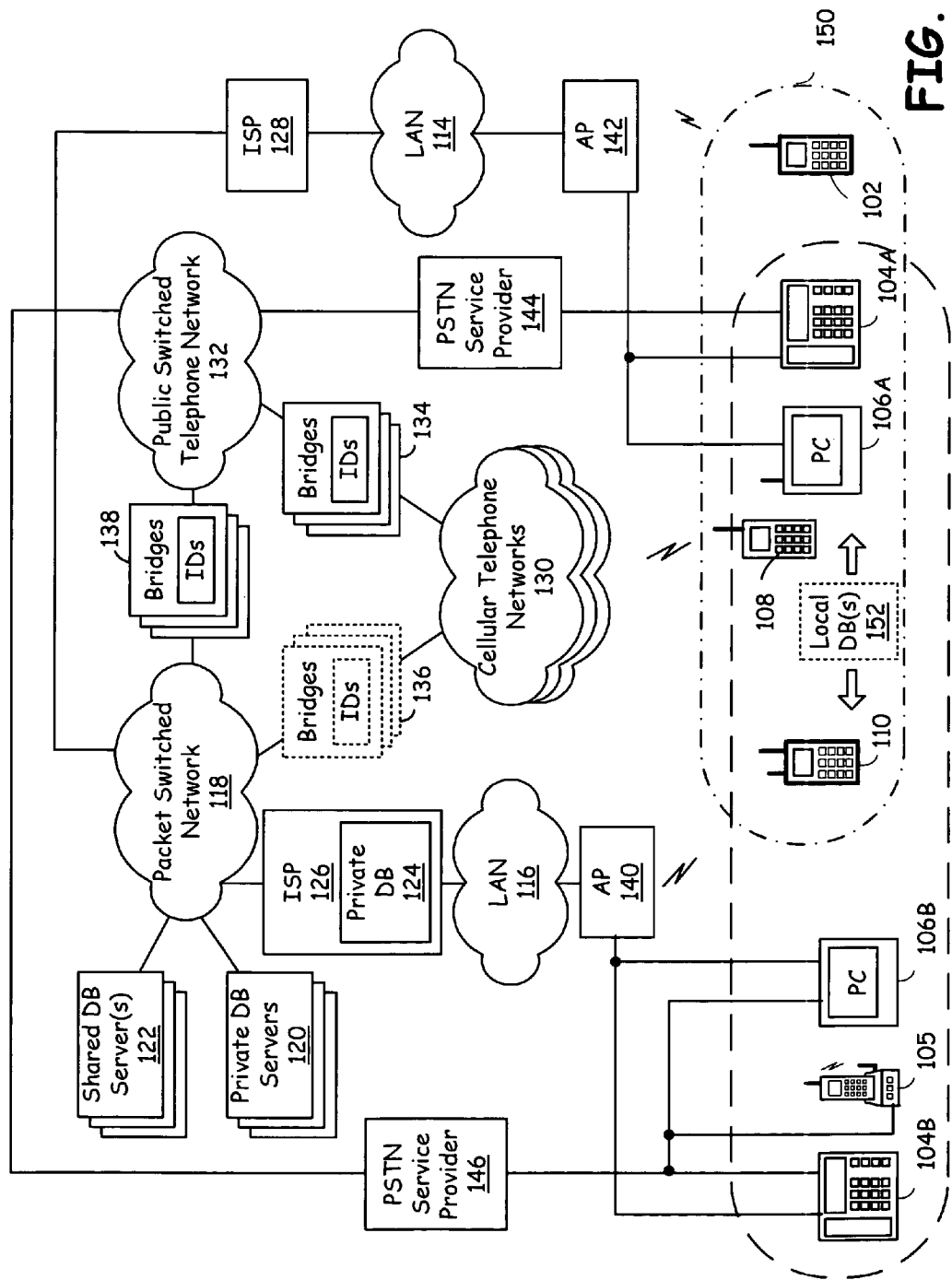
FIG. 1 is a system diagram illustrating network infrastructure operable to support families of client devices that intercommunicate through the registration and secure sharing of network addresses in accordance with the present invention.

FIG. 1 is a system diagram illustrating client terminals (also referred to herein as "telephony devices"), wireless communication systems, and wired communications systems that operate in accordance with one or more embodiments of the present invention. A system constructed and operating according to the present invention includes client terminals 102 and 104. Client terminal 102 is a handheld device, e.g., cell phone, data terminal, voice over Internet protocol (VOIP) handset, etc. Client terminal 104 is a wired terminal such as a PSTN telephone. Client terminal 106 is a personnel computer or laptop computer that may attach to the network using a wired or wireless connection. Client terminal 108 may be a cellular or wireless telephone. Client terminal 110 may be a wireless local area network (WLAN)/cellular telephone operable to communicate either through a WLAN or cellular telephone network. Client terminals 102, 106, 108, and 110 may support wireless communications according to one or more communication protocols including, but not limited to, Wireless Local Area Network (WLAN) protocols such as IEEE 802.11a, b, g, and n, Wireless Personal Area Network (WPAN) protocols such as Bluetooth, cellular protocols such as GSM, IS-95, 1xRTT, 1xEV, etc., and/or other wireless protocols. Client terminals 108 and 110 also support wireless communications via cellular telephone networks 130 and in the case of client terminal 110 wireless communications via a wireless network interface to an associated access point such as access point 140. Further, each of the client terminals may also support one or more wired communications and wired communication standards, including one or more versions of the Ethernet standard and/or other wired standards.

The network infrastructure in FIG. 1 further includes local area networks (LAN) 114 and 116, a packet switch network 118, such as but not limited to the Internet, public switch telephone network (PSTN) 132, cellular telephone networks 130, database servers 120 and 122, private database 124, PSTN service providers 144 and 146, access points (AP) 140 and 142, network bridges 134, 136, and 138, and packet switch network service providers 126 and 128. The wired links include actual wires, optical connections, and/or wired equivalent connectivity.

Servers 120, 122 and private database 124 couples to the packet switched network 118 and may communicate with the client devices 102 through 110. This may be accomplished through wired or wireless links such as those provided by LAN 114 and 116 or AP 140 and 142.

Access points 140 and 142 are operable to support a WLAN protocol such as one or more of the IEEE 802.11 communication protocols and/or a WPAN communication protocol such as the Bluetooth protocol.

Client terminals may associate with one or more access points or networks at any time. For example, client terminals 102 and/or 104 may be members of LAN 114 and the WLAN of AP 142. These associations may change over time. For example, if client device 102 moves within the coverage area of access point 140, client terminal 102 will associate with access point 140. Further, when client terminal 102 is within the operating range of other access points, client terminal 102 will associate with these access points as well. However, when client terminal 102 moves outside of one or more of the operating ranges of any access points, it may disassociate (by default) from one or more of the access points.

The association of the client terminals with the various wireless and wired networks results in the client terminals potentially being assigned a number of (Internet Protocol) IP addresses. The client terminals may then associate internally their username, handle or identifier with their network address (i.e. IP address in the case of internet communications). The client terminal 102 then shares the addressing information and cross reference identifiers with service providers or public/private databases as will be discussed below. The network infrastructure provided in FIG. 1 may support call exchange between a first client terminal and a second client terminal wherein the first and second client terminal are serviced by different service providers. In these embodiments the client terminals access a private database 120, a shared database 122, or a local private database 124, to retrieve addressing information using a cross-reference identifier, i.e., user name, handle. The client terminal may use a user name, handle, or other like identifier as an input, as a cross-reference identifier, in order to retrieve an IP address or address vectoring information in order to initiate and manage calls between client terminals serviced by different service providers. As an individual user may be associated with more than one device, calls may be directed to a number of devices wherein the selection of devices may be prioritized.

Client terminals identifiers, such as a username or handle, may be associated with unique service providers. The username or handle may, like an email address, contain a first part that identifies the user and a second part that identifies the host or service provider. Additionally, each client terminal may be assigned unique IP address when registered with a servicing Internet Servicing provider (ISP) which may change over time. Client terminal registers with the service provider in order to enable communications via the service provider. Either the client terminal or the service provider may then store a network or IP address associated with the client terminal and username, identifier or handle within the shared database. As an individual user may be associated with more than one device, calls may be directed to a number of devices. Furthermore, as the individual devices may be associated with more than one user, the announcements of an incoming call to individual devices may be prioritized.

These client terminals may maintain local status parameters of that client terminal and associated and current users. The current user may be pseudo-permanently preset to a specific user, or may change as a user interacts with a device. For example, logins with or without passwords (including "guest") may be associated with each device or may merely involve one or more button selections to identify the user before the device can be used. In case of PC client terminals 306C and 310C, the operating system user login identity may be borrowed. Each client terminal may receive current status parameter information if authorized from each other device regarding such other devices and associated and current users. Each device may also maintain and exchange all or a portion of the status parameters from other devices outside the immediate family such as friends and business associates.

An individual client terminal, such as wireless VoIP telephone 102 may be associated with a family of client terminals 150. Family of client terminals 150 as shown includes client terminals 102, 104A, 106A, 108, and 110. These individuals' client terminals may associatively store client handle, metadata, and network address information associated with each client terminal within family 150. This information may be stored internally within each of the client terminals or may be stored to a local database 152. When stored to a database this information may be accessible through a servicing network such as a LAN, WAN, WPAN, or the packet switch network.

Metadata associated with users and client handles may be used to manage network based communications (call delivery) within the family of client terminals. For example a user or client handle may be primarily associated with an individual client terminal, such as client terminal 104A. In one example, client terminal 104A may be located within home office. However metadata contained within the family of client terminals may indicate that the user or client handle primarily associated with the home office client terminal may be available via a wireless client terminal 102. The family of client terminals may determine the likelihood of user proximity to individual client terminal based on historical information, time of day information, user provided information or other like information. Instead of primarily routing the call to user terminal 104A, the family may route the call to wireless client terminal 102. Alternatively, another embodiment may initially deliver the network based communication to the client terminal having the greatest likelihood of user proximity to the client terminal and then proxied to another client terminal. For example, again the call may initially be delivered to a client terminal located in the home office such as client terminal 104A. When the call is not successfully delivered to client terminal 104A an announcement either audible or visual may be displayed on all client terminals within family of client terminal 150 or proxied to another individual client terminal.

Alternative to proxying or forwarding of the call, a call may be routed from client terminal 104A to an alternative client terminal such as wireless terminal 105. This may be done by informing the initiating or source client terminal of a new network routing address of the client terminal to which the network based communication is routed. This might be a client terminal within the family of client terminals 150 or outside the family of client terminals. Call announcements may be audible and/or visual announcements. These call announcements may be made on all client terminals within the family, on predetermined client terminals, or an alternating client terminal.

This network infrastructure supports the prioritized delivery of calls between client terminals which may be serviced by different service providers via packet switch network 118. Contained within client shared database 122 is information such as that discussed with reference to FIG. 2.

Figure 2:
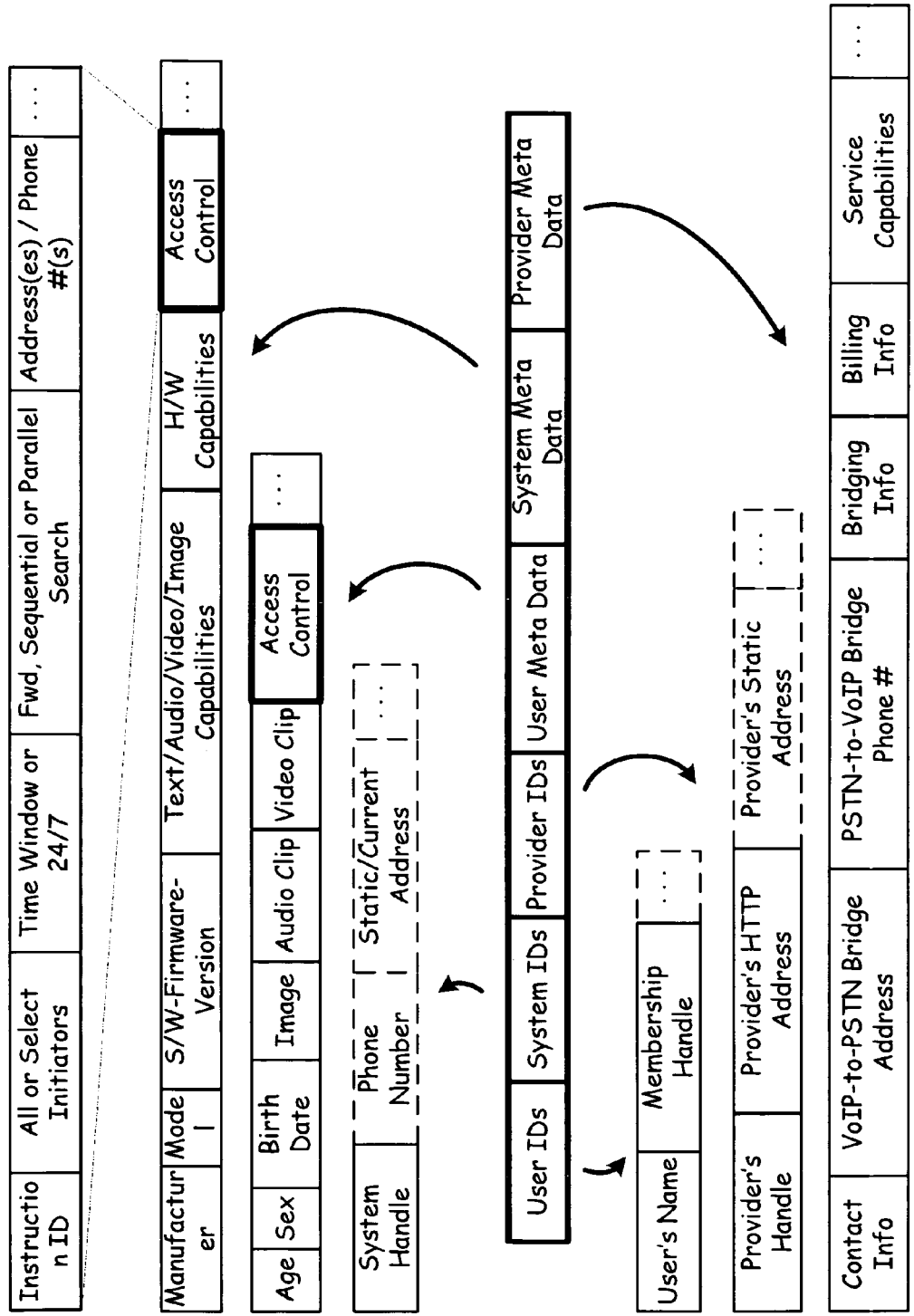
FIG. 2 depicts various cross-reference identifiers which may include one or more user identifiers, terminal identifiers, service provider identifiers, and associated meta data in accordance with an embodiment of the present invention.

FIG. 2 depicts various cross reference identifiers which may include one or more user identifiers, terminal identifiers and service provider identifiers. For example, user identifiers may include user name, member handle or other like information. System identifiers may include a system handle, phone number, ESN, stacker card address, or other like information. A provider I.D. may include a provider handle, a network address, a static address, or other like information. In addition to the user system and provider identifiers, various Meta data may be associated with these identifiers. For example, personal information such as the age, sex, birth date, image, audio clip, video clip, authorization information or other like information may be associated with a user. The terminal identifier may contain information such as manufacturer, model number, software version, multi media capabilities, hardware capabilities, or other like information. The service provider Meta data may include contact information. All this information may be stored within the public/private databases of FIG. 1 and used to facilitate and manage calls between client terminals.

User identifiers may comprise a user's name or some "handle" that uniquely identifies a user with that service provider. A service provider identifier might comprise a web address, provider name, or the provider's static IP address. The terminal identifier might be a computer name, telephone number, or serial number, for example. User information might be nearly anything related or unrelated to the overlying service (age, sex, birthdate, etc.). Terminal information might include manufacturer, model number, firmware/software/hardware version, image/video/audio capabilities, processing power, memory/storage capability, battery capability and status, operational status, available CODECs and versions, etc. As with other metadata, the terminal information might be related or not to the overlying service. Service provider information might include zero or more of service descriptions, service characteristics/limitations, service status, billing info, etc.

This information may associate an individual username, identifier or handle with more than one client terminal. This allows a call to be delivered simultaneously to one or more client devices where the user is likely to be present based on preset or monitored activity and corresponding time of day and day of week. This likelihood may be based on history (recent and long term) and based on "online" or "active" user and device status. This information may be maintained in a shared database located on a remote server or within an adaptive phone book stored in memory of individual client terminals used to initiate calls. This functionality may facilitate call forwarding/conferencing between devices. Call forwarding, in general, can involve either a coordinated handoff of IP addresses or proxying. In the latter case, the client terminal initiating the call request need not know of or support the proxy.

Figure 3:
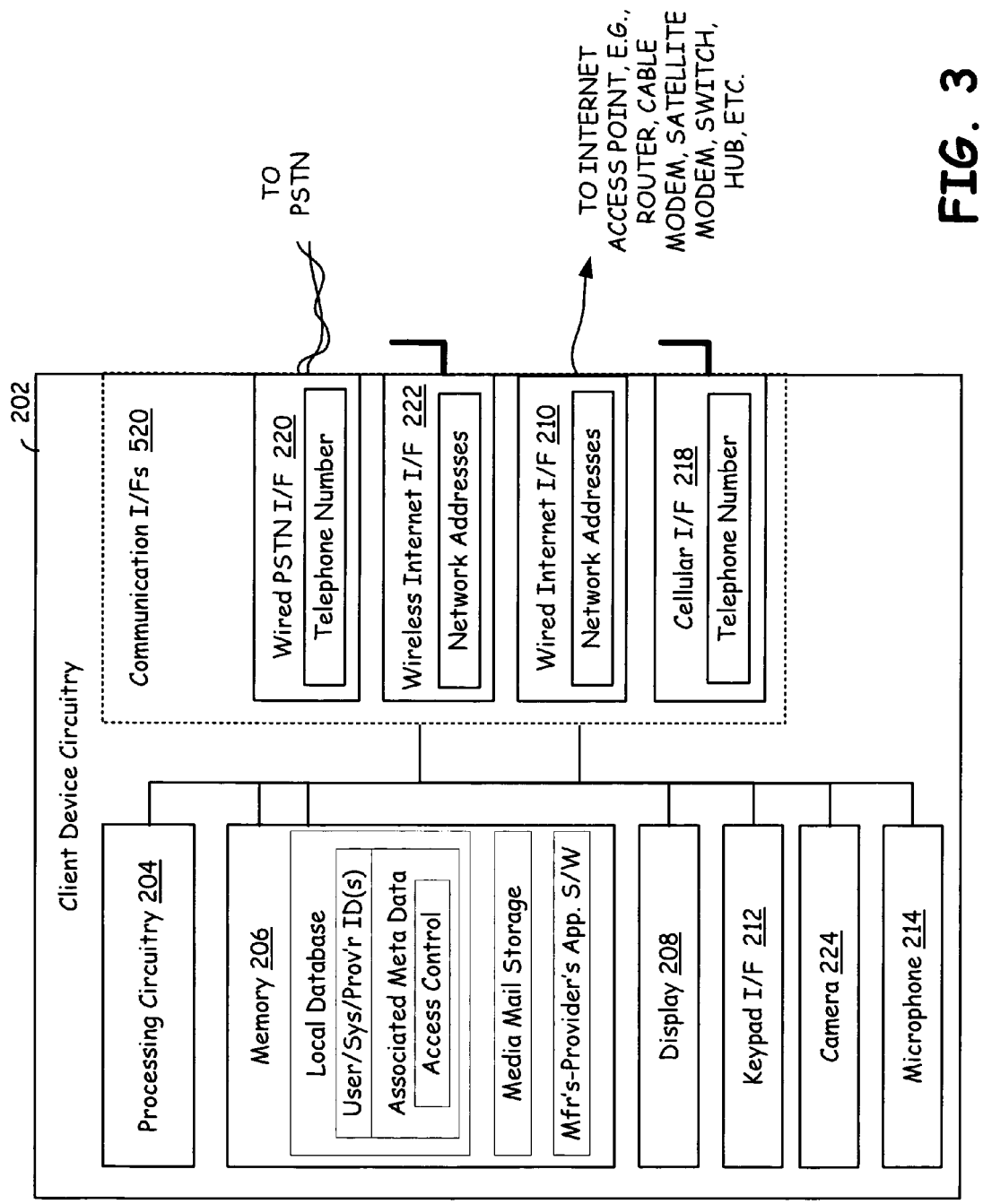
FIG. 3 is a schematic block diagram illustrating the circuitry of one of the client terminals of FIG. 1, according to one embodiment of the present invention.

FIG. 3 is a schematic block diagram illustrating a client terminal constructed according to at least one embodiment of the present invention. Client terminal 202 includes host processing circuitry 204, memory 206, display 208, wired network interface 210, keypad interface 212, microphone/speaker 214, camera 224, cellular network interface 218, PSTN interface 220, and wireless network interface 222. Host processing circuitry 204 may be a microprocessor, a digital signal processor, an application specific integrated circuit, a state machine, an FPGA, and/or other circuitry that is operable to execute software instructions and to manipulate data. Memory 206 may be RAM, ROM, PROM, hard disk drive, and/or other components capable of storing software instructions and data. Network interface 210 may support wired or wireless communications according to applicable communication protocol standards.

The wired network interface 210 and wireless network interface 222 may support packet switched network communications as was previously shown with reference to FIG. 1. Thus, the client terminal may support communications with a router, cable modem, satellite modem, a switch, a hub, and/or another device. Further, the interfaces may support WLAN communications, cellular communications, or other packet switched communications. Not all client devices utilize all of the interfaces 210, 218, 220, and 222. For example, as illustrated in FIG. 1, the client terminal 106, a personal computer, is only configured with the wired interface 210.

Host processing circuitry 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory 206 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 32 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory stores, and the processing circuitry executes, operational instructions.

Client terminal and the client device circuitry 202 supports call exchange with a second or destination client terminal. This first client terminal may be serviced by a first service provider while the destination client terminal is serviced by a second service provider. The communication interfaces allow the client terminal to establish communications with various available networks. Specifically, wired interface 210 and wireless interface 222 allow communication to be established with a packet switch network. When initiating a call the user will interface through the display 208, keyboard interface 212, or microphone 214 to initiate a call. Initiation of a call may involve inputting a handle that uniquely identifies the user associated with the destination terminal. The client terminal may then access a database to obtain address or vectoring information for the destination terminal. Both the initiating and destination terminals not only store information in memory 206 but may upload this information or a portion of this information to the public or private databases. In this way processing circuitry 204 may properly configure the communications with the client termination for communications with the destination terminal based on the terminal and provider capabilities as well as user-defined inputs provided to both the initiating and the destination client terminal.

When multiple client terminals 202 are located within a common environment or when multiple users are sharing one or more client terminals, management of communications, both incoming and outgoing, may be required. In the case where multiple client terminals 202 are located within a common environment, each client terminal may be associated with at least one handle (user) and/or network address. This family of devices may know the handles and network addresses of each client terminal within this "family" of client terminals.

Figure 4A:
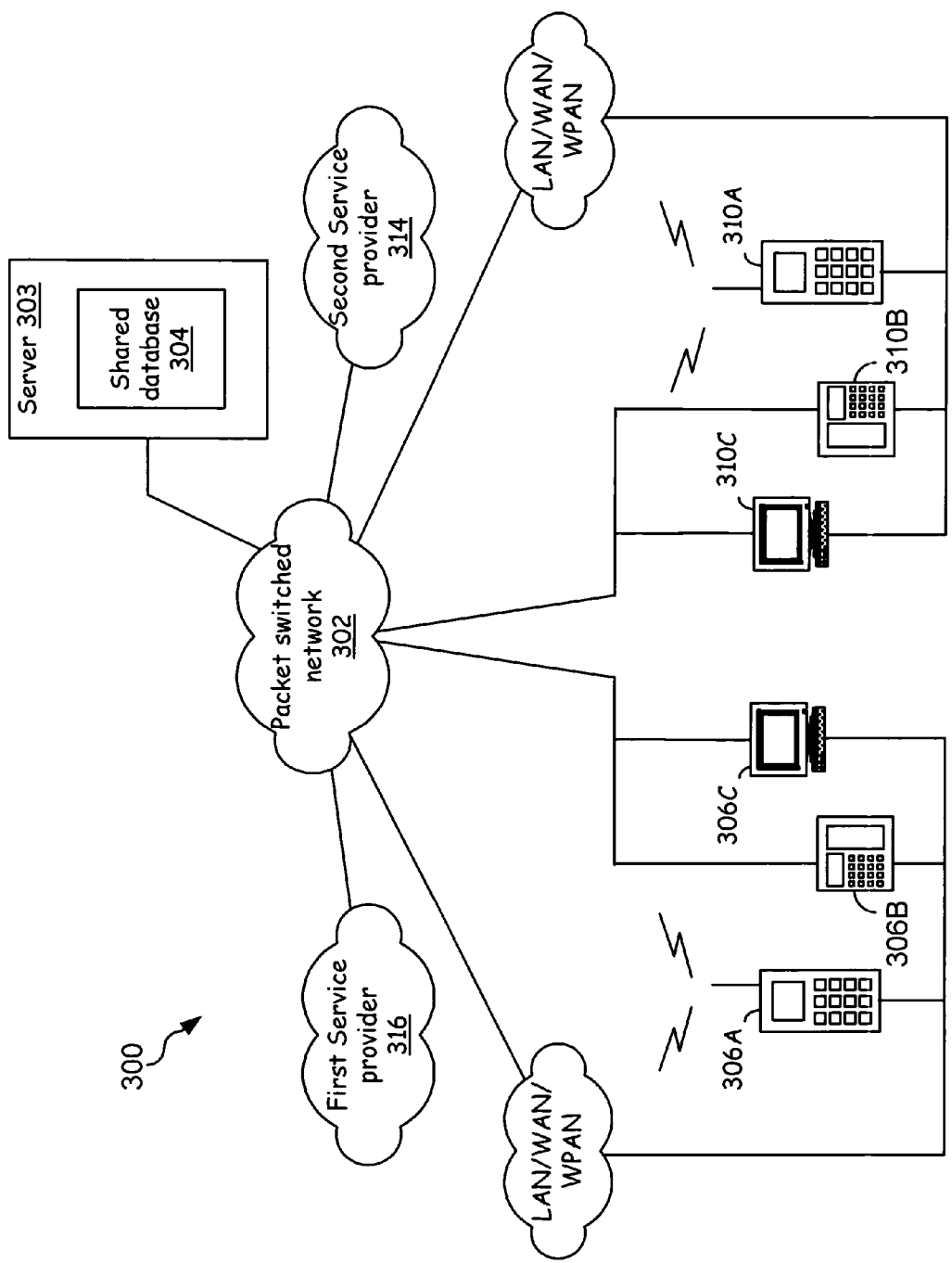
FIG. 4A is a system diagram illustrating a network infrastructure operable to support network based communications that intercommunicate through the registration and secure sharing of network addresses from multiple service providers in accordance with one or more embodiments of the present invention.

FIG. 4A is a system diagram illustrating a network infrastructure operable to support call exchanges between any two or more of a plurality of client terminals in accordance with the present invention. This network infrastructure 300 includes a packet-switched network 302, a shared database 304, a first client terminal, such as wireless client terminal 306A, wired client terminal 306B, or PC terminal 306C, a second client terminal, such as wireless client terminal 310A, wired client terminal 310B, or PC terminal 310C, a second service provider 314, and a first service provider 316. Client terminals 306A, 306B, 306C, 310A, 310B and 310C may have a username, handle or other identifier associated with the device or user. Additionally, these client terminals may support network based communications using a service provider such as but not limited to Skype, AOL's Instant Messenger (AIM), Microsoft MSN Messenger, Yahoo Messenger, and other like services that provide text and voice services.

The username handle or other identifier may be established with service provider 316 or 314. First service provider 316 and second service provider 314, as well as shared database 304, may all communicatively couple to the packet-switch network 302. The service providers servicing the first and second client terminal may differ according to various embodiments of the present invention. The packet-switch network 302 may be a network such as but not limited to the Internet or other like packet-switched network.

The client terminals have identifiers such as a username or handle and may be associated with unique service providers. The username or handle may, like an email address, contain a first part that identifies the user and a second part that identifies the host or service provider. Additionally, each client terminal may be assigned unique IP address when registered with a servicing Internet Servicing provider (ISP) which may change over time. Client terminal registers with the service provider in order to enable communications via the service provider. Either the client terminal or the service provider may then store a network or IP address associated with the client terminal and username, identifier or handle within the shared database.

This network infrastructure supports the exchange of calls between client terminals serviced by different service providers via packet switch network 302. When first client terminal 306 seeks to establish or initiate a call request to second client terminal 310 using shared database 304, which may be hosted on web server 303, to access a network address or vectoring information associated with the destination terminal. Contained within client shared database 304 are username, identifier, or handle information associated with the client terminals, network addresses and metadata. This metadata may contain network capabilities information, communication capabilities information, terminal capabilities information, user defined criteria, and/or security information. In one embodiment this information may describe the CODECs which are to be employed in order to support the communications between the first client terminal and second client terminal. Other types of information that may be associated with the client terminal via the shared database may be security information. Security information may require that the second client terminal contain authorization information for the first client terminal prior to supplying the network address to the first client terminal. In other embodiments this metadata may be CODEC capabilities, multimedia capabilities, latency information, user information, user email address information, user phone number information, VoIP client terminal location information, quality information, VoIP service provider, session information, network information, call authorization criteria, pathway information, port information. User defined metadata may describe how calls are to be handled based on the time of day user, time of day for the call request, time of day for the client terminal(s) associated with the destination IP addresses, day of week for the user, day of week for the call request, day of week for the client terminal (s) associated with the destination IP addresses, geographic location of the user, geographic location initiating the call request, geographic location of the client terminal(s) associated with the destination IP addresses, expected proximity of the user to the VoIP client terminal(s) associated with the destination IP addresses, and/or the relationship of the user to a party initiating the call request to the user receiving the call.

In other embodiments, these client terminals may be associated with a number of network addresses. Individual network addresses may be associated with the type of incoming call, the specific communication pathway, or other factors associated with the communication. For example, a terminal may have one IP address for voice communication and other IP addresses for a text, multimedia or audio/video communication. Other network addresses may be available for technical support.

Shared database 304 may store vectoring information to the service providers in place of specific network addresses associated with individual client terminals. Thus, when a first client terminal initiates a call or call request, the first client terminal retrieves vectoring information from shared database 304. This vectoring information may include a second service provider network address that directs the first client terminal to the second communication. The second service provider then provides the network address of the destination client terminal directly to the first client terminal. The first client terminal then may use the network address to establish a call with the second (destination) client terminal.

FIG. 4A sets forth a shared database solution that stores all of the currently "unshared" information from a plurality of service providers. In other words, a central database receives a copy of each (at least a portion of each) service provider's database. Each service provider may: 1) continue to operate and maintain a local copy with period or simultaneous shared database updating; 2) maintain additional cross reference identifiers and metadata than that copied to the shared database; and 3) dump duplicate information from the local database and rely on the shared database's storage.

Figure 4B:
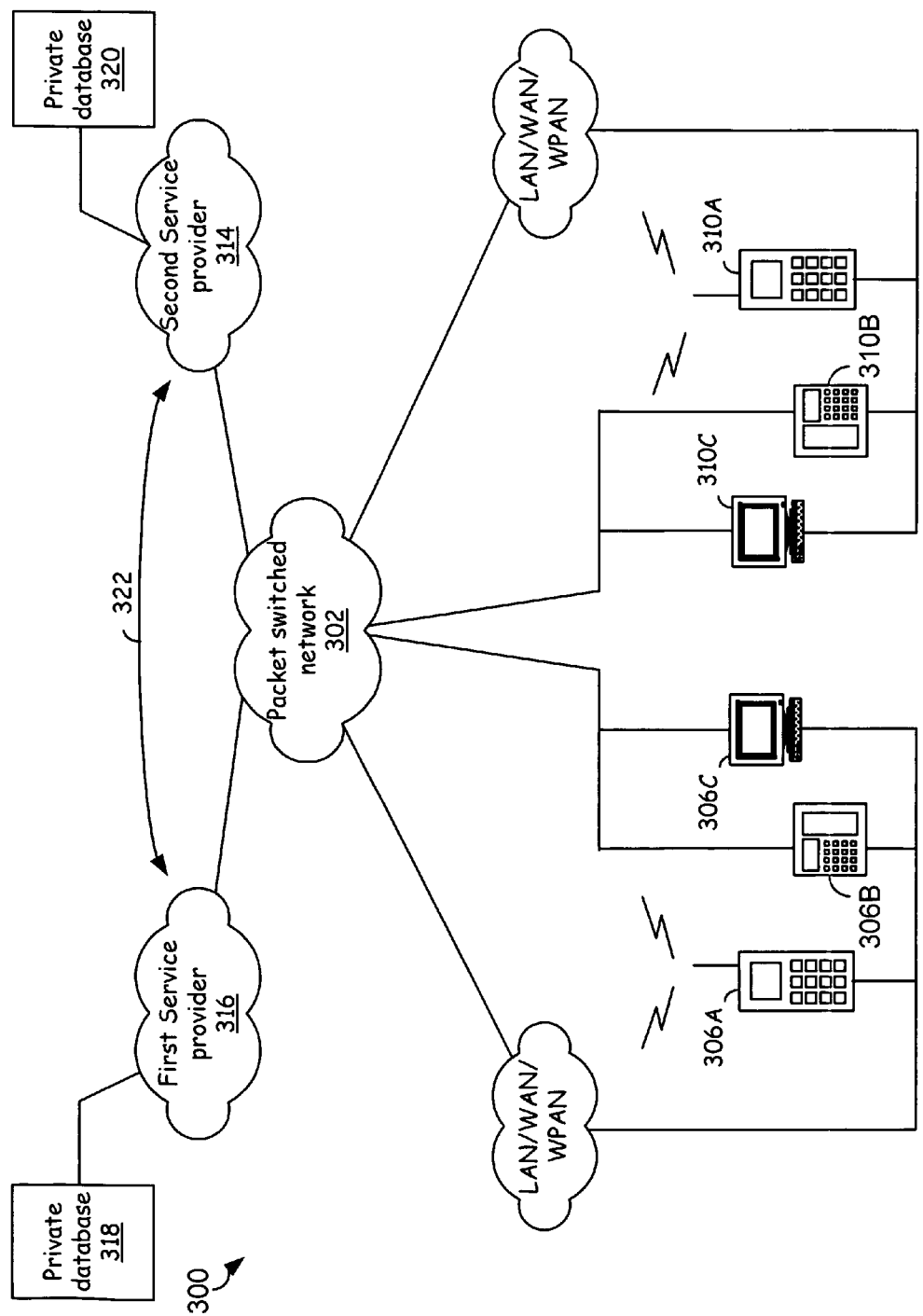
FIG. 4B is a system diagram illustrating a network infrastructure operable to support network based communications that intercommunicate through the registration and secure sharing of network addresses from multiple service providers in accordance with one or more embodiments of the present invention.

Another embodiment, as illustrated in FIG. 4B may not entail a central shared server at all but merely a mechanism for sharing. This may involve a communication pathway 322 between service providers 314 and 316, through which one service provider (i.e. service provider 314) would probe the private database (i.e. database 320) to find a foreign terminal's network address and more. That probing could also include "status" and other information as described with reference to FIG. 2 in an ongoing manner. In this scenario, the initiating client device (i.e. 306A, 306B or 306C) need only communicate with its service provider (i.e. service provider 316) to retrieve the information required to initiate and manage a call to destination client device (i.e. 310A, 310B or 310C).

Communication pathway 322 may entail an Industry Standard interface between service providers 314 and 316 or a proprietary interface. Alternatively, the burden could be placed on the client device. Therein, an initiating client device (i.e. 306A, 306B or 306C) would need to use the service provider and client terminal identifiers to locate the foreign service provider and make the request. As above, this could entail an Industry Standard interface between unassociated client's and service providers. In addition or alternatively, this might involve downloading a small software module for non-member clients that governs a proprietary interaction and/or proprietary graphical interface. The display could be fully or partially combined (that is native service provider phone book and interaction may integrate a foreign user and underlying foreign service provider. Alternatively, the display may be generated in a separate application using via, for example, the non-member download module comprising an independent application.

Figure 5:
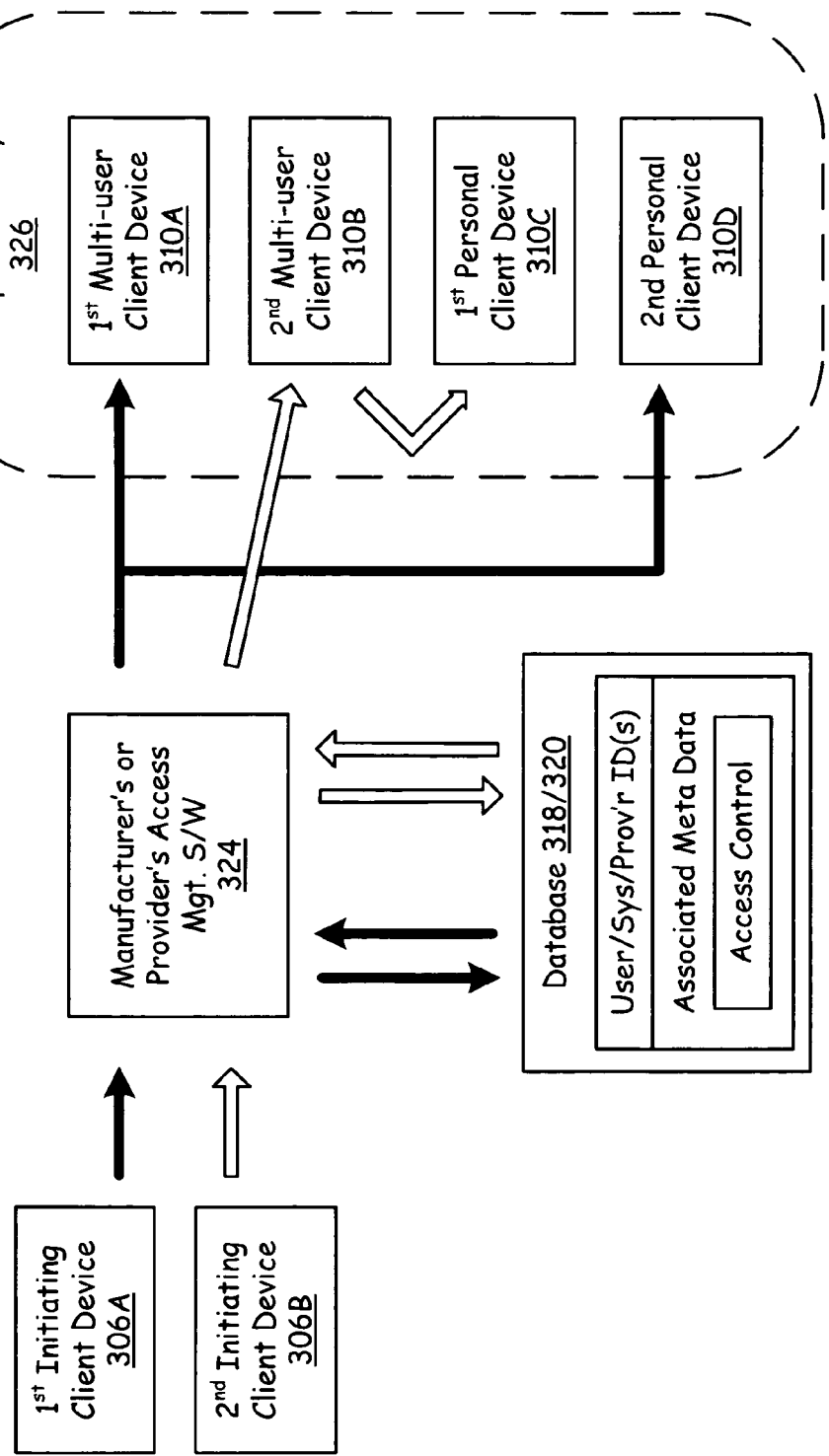
FIG. 5 illustrates how information or communications may flow between client devices and service providers in order to facilitate a call or communication between the first client device and a destination client device wherein both client devices are serviced by different service providers in accordance with one or more embodiments of the present invention.

FIG. 5 illustrates how information may flow in order to facilitate a call or communication between a first client device 306A and the destination client device 310A located within a family 326 of client devices. Each client device located within family may contain in local memory or have access to a local database. This local database may be associated with the multiple client devices of family 326, calls may be directed to a number of devices wherein the selection of devices may be prioritized.

Client terminals 310A-D may maintain local status parameters of that client terminal and associated and current users associated with the client devices of family 326. Each device may also maintain and exchange all or a portion of the status parameters from other devices outside the immediate family such as friends and business associates.

Metadata associated with users and client handles may be used to manage network based communications (call delivery) within the family of client terminals. For example a user or client handle may be primarily associated with an individual client terminal, such as client terminal 310D. However metadata contained within family 326 may indicate that the user or client handle primarily associated with client terminal 310D may be available via a client terminal 310A.

The priority of devices chosen to receive the call may be determined by a software application executed within the receiving client device or a local server coupled to and operable to service family 326. The flow of the call from initiating device 306A indicates that the call may be directed to devices 310A and 310D. Client device 310A may be a multi-user device associated with the intended call recipient while device 310D is a personal device that may be uniquely associated with the intended call recipient. This call may be delivered simultaneously to these devices or sequentially (i.e. first personal client device 310D and then multi-user device 310A).

Figure 6:
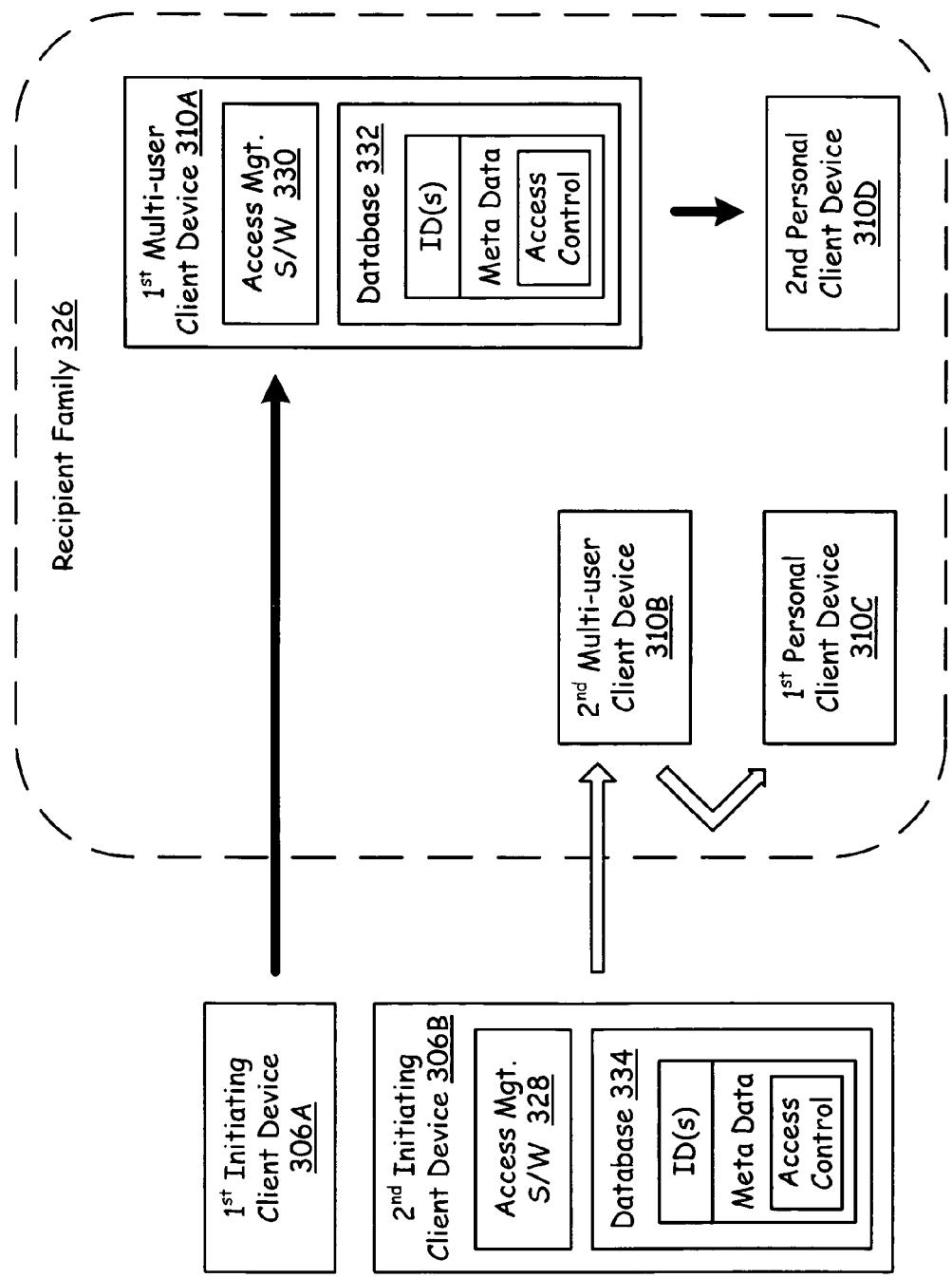
FIG. 6 illustrates how information or communications may flow between client devices and service providers in order to facilitate a call or communication between the first client device and a destination client device wherein both client devices are serviced by different service providers in accordance with one or more embodiments of the present invention.

FIG. 6 depicts an example where access control is associated with call delivery. This access control may be managed via either the initiating client device or the receiving client device. In a first example, initiating client device, 306A attempts to establish a call with a user associated with a client device within recipient family 326. This call may be initially received by a first client device, 310A. Access Management software 330 and the local database 332, contained within memory of the first multi-user client device 310A or executed on a server accessible to the first client device, may verify the access control. Should access be granted and the call delivery fail, the call may be forwarded or proxied to a second personal client device 310D associated with the user. The example associated with the second initiating client device 306B indicates that the Access Management software 328 and local database 334 may be executed by client device 306B. On providing the appropriate access information to establish the call, the call may be routed to a first multi-user client device 310B. This call may then be vectored or redirected should the call delivery attempt fail to another client device such as personal client device 310C.

Alternatively, the family of client terminals may determine the likelihood of user proximity to individual client terminal based on historical information, time of day information, user provided information or other like information. Instead of primarily routing the call to a predetermined terminal or set of terminals, the family may route the call to first device having the greatest likelihood of user proximity to the client terminal. After this first delivery attempt fails, the call may be proxied to another client terminal. Such an example is shown with respect to the call from the second initiating device 306B. This call is first delivered to client device 310B and then proxied to client device 310C. When the call is not successfully delivered to prioritized client terminals, an announcement either audible or visual may be displayed on all or a subset of client terminals within family 326 or be proxied or vectored to another destination.

Figure 7A:
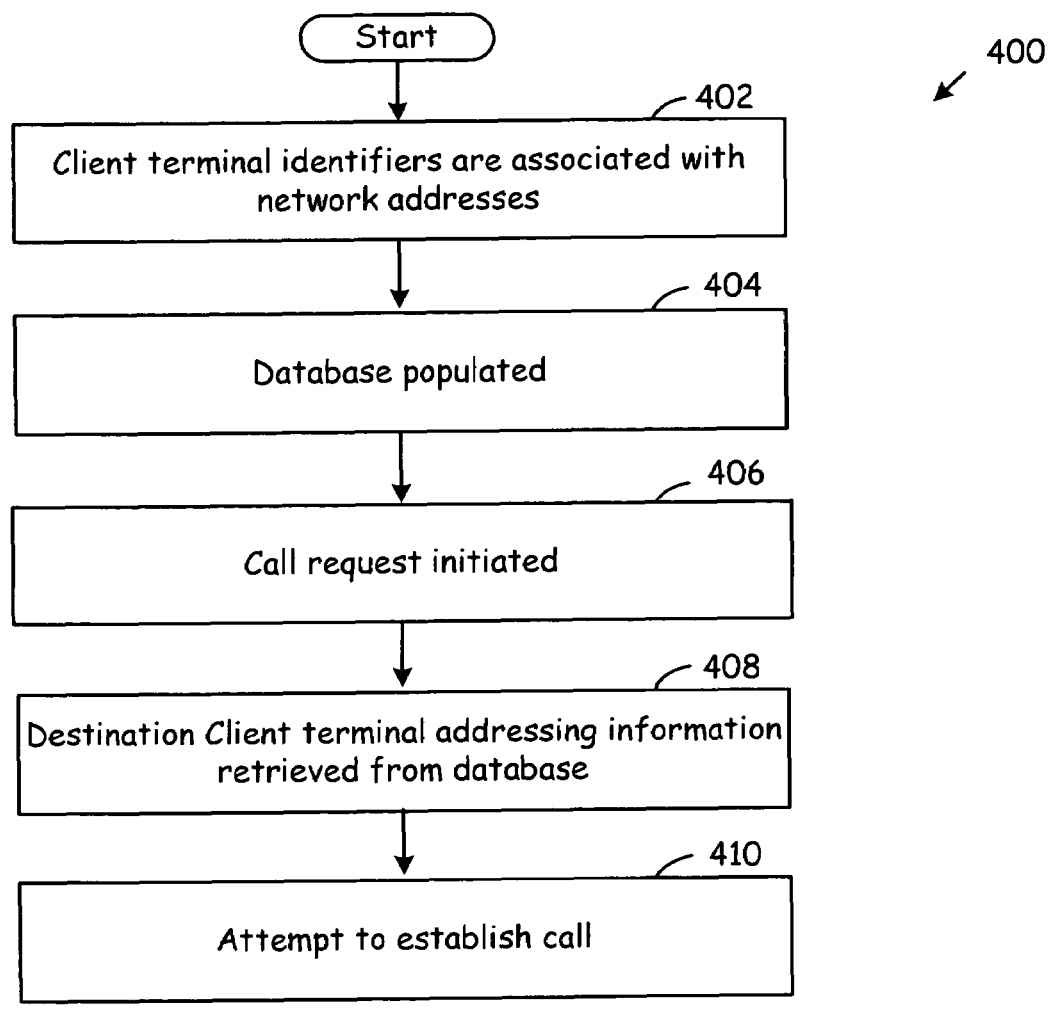
FIGS. 7A and 7B provide logic flow diagrams illustrating the method of servicing a call between a source client terminal and a destination client terminal wherein the source and destination client terminals are serviced by differing service providers in accordance with one or more embodiments of the present invention.

FIGS. 7A-12 provide logic flow diagrams that relate to specific operations performed in accordance with embodiments of the present invention. FIG. 7A provides a logic flow diagram illustrating a method of servicing a call between a source client terminal and a destination client terminal. Operations 400 begin with step 402. In step 402, client terminal identifiers are associated with client terminal network addresses. These associations are stored within a shared database available through a network connection. After this shared database has been populated in step 404, the shared database may be accessed to service call requests initiated from a source terminal in step 406. This call request should include a destination identifier such as a username, handle or other identifier. In step 408, the shared database is accessed based on the destination identifier within the call request to retrieve a network address associated with the destination client terminal. In step 410, the source client terminal may then attempt to establish a call with the destination client terminal using the network addresses retrieved in step 408. In addition to retrieving network address, metadata within the shared database may further define the communications between the source client terminal and the destination client terminal. This call may be a voice communication, such as VoIP or any combination of voice, audio, video, text or between the source client terminal and destination client terminal.

Figure 7B:
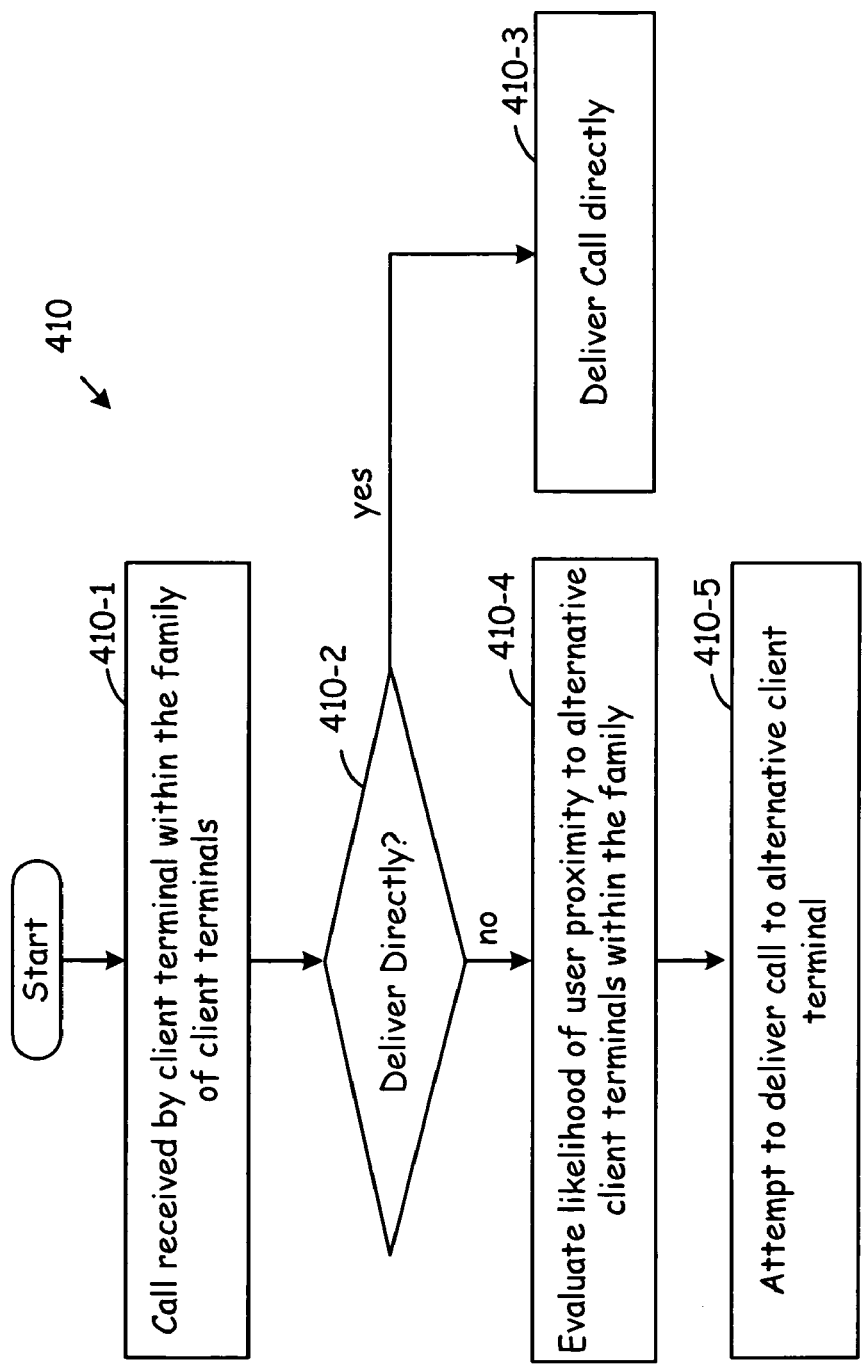

Operations associated with step 410, when an attempt to establish a call with the destination client terminal, are discussed in further detail with reference to FIG. 7B. In step 410-1, a call is received by a client terminal within the family of client terminals such as family 326 discussed with reference to FIGS. 5 and 6. At decision point 410-2, an attempt is made to deliver the call directly to the client terminal identified with the network routing address retrieved. If the call is able to be directly delivered, then in step 410-3 the call is delivered to that destination client terminal. Otherwise, in step 410-4 an attempt is made to evaluate the likelihood of user proximity to alternative client terminals within the family. Then step 410-5 attempts to deliver this call to the alternative client terminal is made. The delivery of the call from one client terminal to another may involve the proxy of a client terminal by the first client terminal or the redirection of the incoming call or network-based communication to the ultimate destination client terminal. In other embodiments the call delivery attempt may be made to any combination of the client terminals within the family of client terminals.

The data contained within the shared database may be periodically updated. As IP addresses are dynamically assigned, it may become necessary for client terminals to update the shared database periodically or when a specific events occur. These periodic updates maybe done using messaging services such as, but not limited to, text messaging, short-messaging services (SMS), email communications, instant messaging (IM), enhanced messaging service (EMS), and multi-media messaging services (MMS).

The metadata contained within the shared database may describe the communication capabilities, terminal capabilities and network capabilities. The communication capabilities and terminal capabilities may describe the types of communications that the terminals may support. For example, whether or not voice, text or multimedia communication capabilities are present. In addition to describing the capabilities of the terminal, user defined criteria regarding communications, the network capabilities associated with the client terminal may be included in the metadata. The network capability information may include bandwidth limitations, or whether or not dedicated band width is available.

Figure 8:
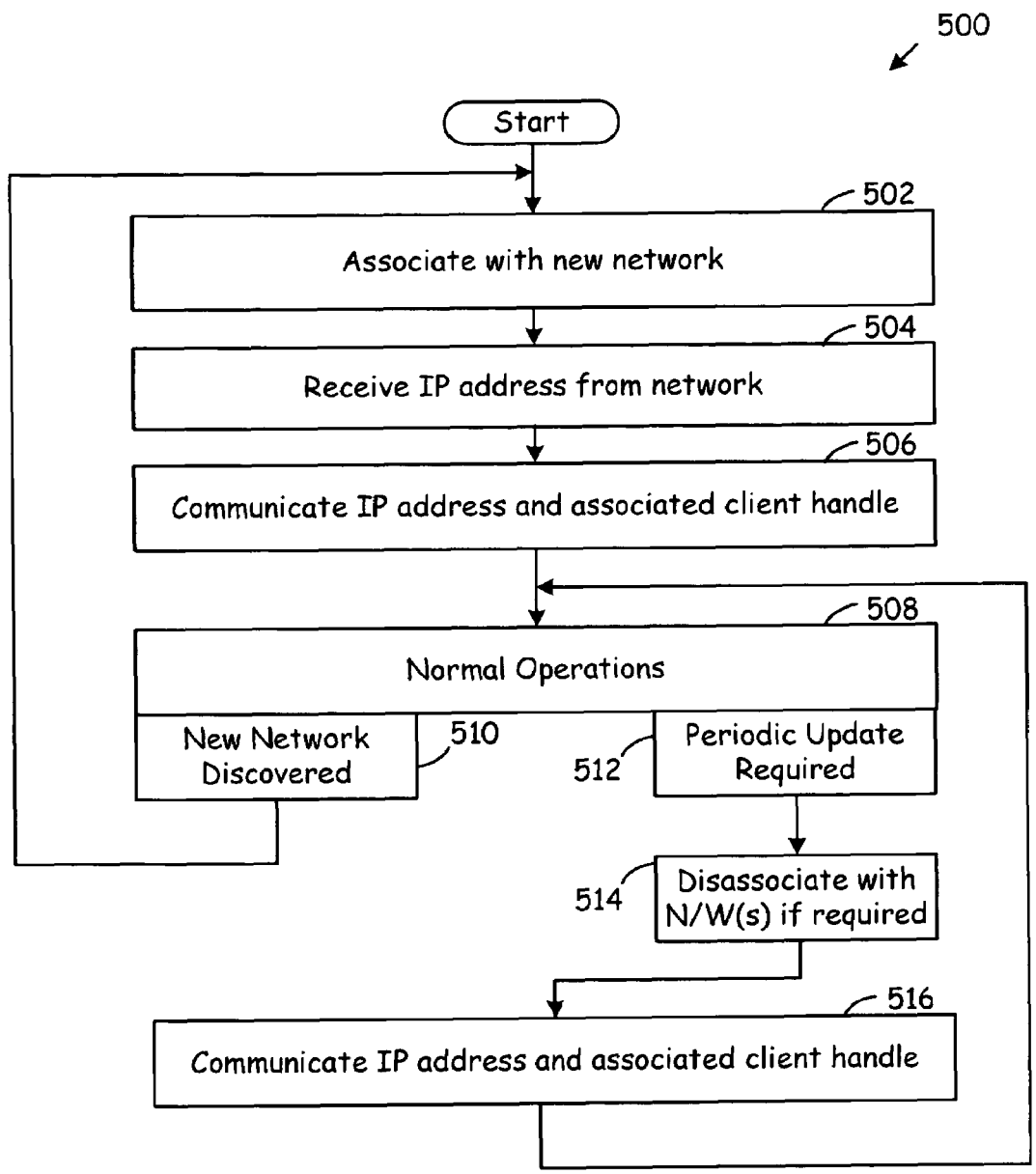
FIG. 8 provides a logic flow diagram illustrating how individual client devices may communicate to a network address information and meta data to a service provider or third party database in accordance with one or more embodiments of the present invention.

FIG. 8 is a flow chart illustrating operations 500 according to one embodiment of the present invention. These operations commence with a client terminal associating with a particular network in step 502. This new network may be a wireless network or a wired network. Upon association with the new network, the client terminal exchanges user information with the new network and the new network registers the client terminal. Registration may require password exchange from the client terminal to a point of access of the network, e.g., access point 140 or 142 of FIG. 1. The network then assigns a unique IP address to the client terminal and transmits the IP address to the client terminal in step 504. In response to receiving the IP address from the network, the client terminal communicates the IP address and additional information (i.e., username, handle, identifier and other metadata) to either the service provider or the shared database in step 506. For each IP address, the client terminal may report metadata, such as the new network type, current loading parameters of the new network, current noise/interference properties of the connection that the client terminal has to the new network, location information, security information and/or power usage characteristics performed by the client terminal in communicating with the new network. Additional information or metadata that may be reported by the client terminal may further include the cost associated with communicating via the new network, a user desirability of communicating via the new network, security information regarding the new network, and an access point IP address of the new network with which the client terminal associates, if available.

Referring again to FIG. 1, client terminal 102 may roam to the service area of access point 140 from the service area of access point 142. In this example, the client terminal is previously associated with access points 142 as well as with access point 140. Upon associating with the new access point 140, client terminal 102 becomes associated with the access point 140 and receives an IP address. In response, the client terminal 102 communicates the new IP address access point 142. Further, with the IP address reported, the client terminal may report the additional information as well. This report may also disassociate the client terminal from the previous network if applicable.

Referring again to FIG. 8, after communication of the IP addresses and the additional information is complete, normal operations are established in step 508. When the client terminal discovers another new network in step 510, operation returns to step 502. During normal operations 508, the client terminal may determine that a periodic update is required in step 512. This update may be required by a predetermined schedule or other like criteria. Such periodic update may require that the client terminal disassociate with one or more networks with which it is currently associated in step 514. When the client terminal disassociates with a network, the IP addresses and additional information may be directly or indirectly communicated to the shared database so that latency of addressing information within the shared database is reduced. From step 516, operation returns to step 508.

Figure 9:
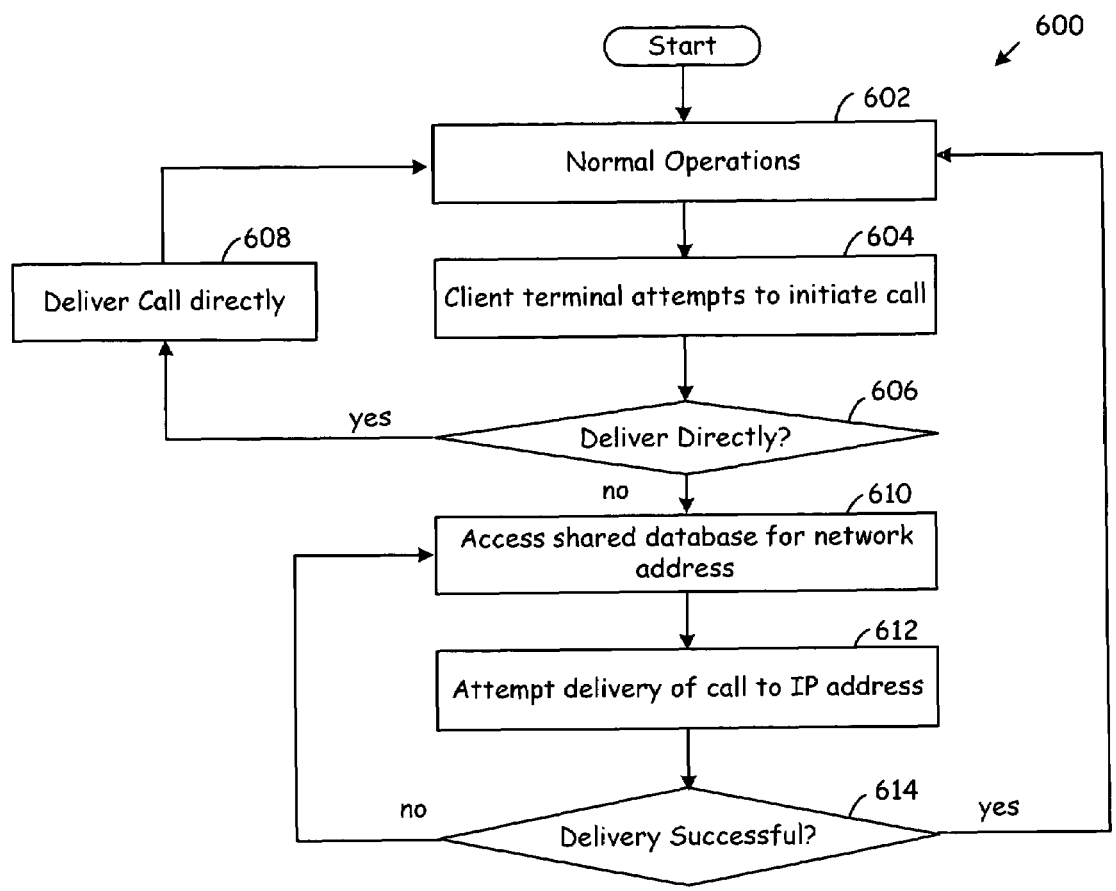
FIG. 9 provides a logic flow diagram depicting the initiation of a call from a client terminal serviced by a first service provider to a shared database.
Figure 10:
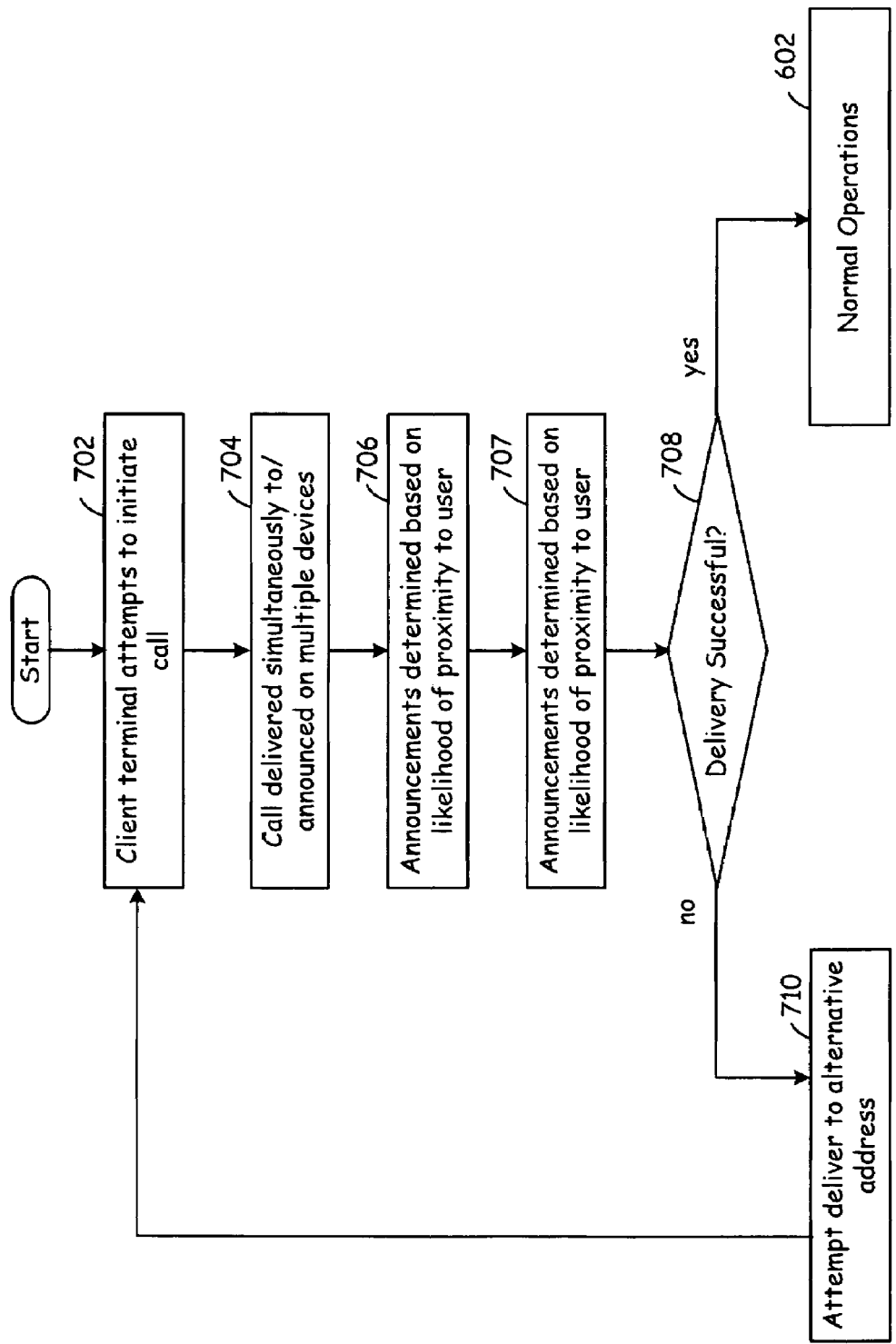
FIG. 10 provides a logic flow diagram wherein a first client terminal initiates a call to a second client and vectoring information is obtained from a third party database and is used to vector the call to the destination terminal in accordance with one or more embodiments of the present invention.

FIG. 9 is a flow chart depicting the initiation of a call according to an embodiment of the present invention. Operations 600 commence at step 602 where a client terminal, performing normal operations, attempts to initiate a call with a call request in step 604. This call request initially seeks to establish a call using the service provider that serves the client terminal initiating the request. At a decision point 606, a determination is made as to whether or not the call may be established within the service provider servicing the first client terminal. If the call may be serviced entirely using the service provider servicing the client terminal initiating the call, then the call may be established directly with the destination terminal in step 608. However, if a determination is made that the service provider handling the destination client terminal is not the same as the service provider servicing the initiating client terminal, then the shared database is accessed in step 610. Access of the shared database yields either addressing information or vectoring information operable to direct the call request to the destination in step 612. The call request accesses the shared database using a username, handle, or other like identifier to retrieve the network address or vectoring information associated with the destination client terminal.

In step 612, an attempt is made to establish the call with the network information accessed in step 610. Although described as based on information retrieved from the shared database. This process may occur entirely within a single service provider as part of step 604. This attempt is described in further detail with reference to FIG. 10. The attempt to deliver the call is initiated in step 702. This involves delivering the call simultaneously to multiple devices in step 704. The call may be announced differently on individual devices. For example, a device may specify that silent notifications are to be utilized only. Additionally, as determined in step 706, devices likely to have a greater proximity to the user may present an audible announcement while devices having a lower likelihood of proximity to the user may merely present a visual announcement. However, any device receiving the call request may be utilized to complete the call as determined at decision point 708. Should the call be completed, the normal operations of step 602 in FIG. 9 resume. Otherwise an attempt to deliver the call to an alternative address or mailbox may be initiated in step 710.

In other embodiments, textual indications of incoming calls are displayed on every device with audio indications occurring sequentially or in groups on one or more associated devices. For example, when a call is received during a user's "office hours," the first audible ring is presented simultaneously at office client terminals. After several ring attempts, the initiating client terminal is informed that other locations are being checked with a "checking other locations" message to the caller. This may attempt to deliver the call to a mobile phone, pc and vacation or home desktop client terminal having a lower likelihood of proximity to the user. Whichever device that receives the pickup is connected to the caller and the ringing and attempts at other devices terminates. Voice mail or other alternative mailboxes is not triggered by all devices, but instead just one upon identifying the failure to deliver the call.

The identity of the client terminal device receiving the call may be used to update the database for future incoming calls. In this way, the client terminal receiving the call is at least temporarily assigned a higher likelihood of proximity to the user.

When the call is a text only exchange such as IM, a message that a "textual response is pending" audio message may be delivered to the devices. This announcement or ring may be terminated following delivery of a finalized textual message that may begin a text chat. Also, text chat call when answered may present that a "textual message is available."

A call conferencing situation may arise in a home, where multiple client terminals are "associated" and ring together, in sequence or round-robin ringing) if the intended recipient is unidentified or whereabouts within the house are unknown. In one embodiment, the shared database has knowledge of such association and delivers pluralities of IP addresses to the caller's system to perform such call functionality. In another, a local server acts as a proxy or branch exchange to establish the ring pattern to the association and delivers only a single IP address upon pickup to the calling system.

In yet another embodiment, each associated client terminal knows the current IP address of the associated others. The shared database delivers one of the IP addresses to the client terminal initiating the request. The initiating client terminal sends a call request to the single IP address provided by the shared database. The recipient client terminal then contacts the other associated client terminals to manage the call pattern. If the recipient client terminal answers, the call continues using the recipient's network address. Alternatively, if an associated client terminal answers, either the recipient acts as a proxy for the answering client terminal without troubling the calling system or the recipient and/or answering client terminal coordinate an IP handoff with the calling system.

Three way calls can also operate with or without the knowledge of the other client terminals. With other side knowledge and participation, a three way (or more) call can be established during a point to point 2 client terminal system by having one client terminal establish the request and have all 3 client terminals exchange packets and combine them before presentation via the speakers. Another approach is to have the client terminal that establishes the $3^{rd}$ and so on call to combine packets of and for the $3^{rd}$ client terminal effectively act as a proxy between the two phones. With such configuration, neither the $1^{st}$ or $3^{rd}$ phones need to know that the other even exists. The server might also perform such combination but will require significant processing resources to handle wide deployment. Lastly, the $2^{nd}$ phone may proxy but not recombine packets for the $3^{rd}$ phone (i.e., merely act as a forwarding node) for the $1^{st}$ and $3^{rd}$ phones. Both of such phones will then have the obligation to process both packet streams without having to know each others IP addresses.

The metadata may contain network capabilities information, communication capabilities information, terminal capabilities information, user defined criteria, and/or security information. In one embodiment this information may describe the CODECs which are to be employed in order to support the communications between the first client terminal and second client terminal. Other types of information that may be associated with the client terminal via the shared database may be security information. Security information may require that the second client terminal contain authorization information for the first client terminal prior to supplying the network address to the first client terminal. In other embodiments this metadata may be CODEC capabilities, multimedia capabilities, latency information, user information, user email address information, user phone number information, VoIP client terminal location information, quality information, VoIP service provider, session information, network information, call authorization criteria, pathway information, port information. User defined metadata may describe how calls are to be handled based on the time of day user, time of day for the call request, time of day for the client terminal(s) associated with the destination IP addresses, day of week for the user, day of week for the call request, day of week for the client terminal(s) associated with the destination IP addresses, geographic location of the user, geographic location initiating the call request, geographic location of the client terminal(s) associated with the destination IP addresses, expected proximity of the user to the VoIP client terminal(s) associated with the destination IP addresses, and/or the relationship of the user to a party initiating the call request to the user receiving the call.

At decision point 614, a determination is made whether or not the call was successfully delivered. If a successful call was established, normal operations for the client terminal will continue in step 602. Otherwise, if the network address is not valid or a successful call was not initiated at decision point 612, the call request may again access the shared database where the information within the database is updated and an alternative IP addresses for the client terminal may be sought from the shared database. The shared database may associate more than one network address with a username, handle, or identifier. This may involve associating more than one device with an individual username, handle or other like identifier where different devices have unique network addresses associated with the device, or where multiple network addresses are associated with a single device. Priority may be given to a first network address. Should that network address fail, an alternative network address may be sought for the destination terminal. This priority may be based on the most likely location of the user associated with the username, handle or identifier. Where multiple network addresses are associated with a destination terminal or a destination user, the different types of communication available may depend on the network address selected from the shared database. For example, a call may initially seek a voice call. Should the voice call fail, text instant messaging (IM) may be established between the source client terminal and destination client terminal. Additionally, should the destination client terminal be unavailable, the call may be directed to a voice mailbox having a different network address.

Returning to FIG. 9, when the call is unable to be delivered directly using the first service provider as determined at decision point 604, the shared database may be accessed in step 608. In this case, vectoring information is retrieved from the shared database. In addition to vectoring information associated with the destination client terminal, metadata may be retrieved that may be used to define network capabilities, terminal capabilities, communication pathway capabilities, or other like information used to manage the call as described with reference to FIG. 10. This vectoring information may be used in to direct the call to a second service provider. This second service provider then may provide a network address of the destination terminal to the source client terminal.

Some network connections are not robust or the addressing information may become stale. The former is the case when a client terminal is on the fringe of a wireless coverage area and/or when the client terminal is roaming outside its normal service area. Further, the client terminal may be engaged in some activity such as participation with another network or may be asleep with respect to a particular network. Such other activity may prevent direct receipt of packet data based call directed at a specific network address. In such cases, indirect delivery according to the operations of FIGS. 9 and 10 may be attempted.

Figure 11:
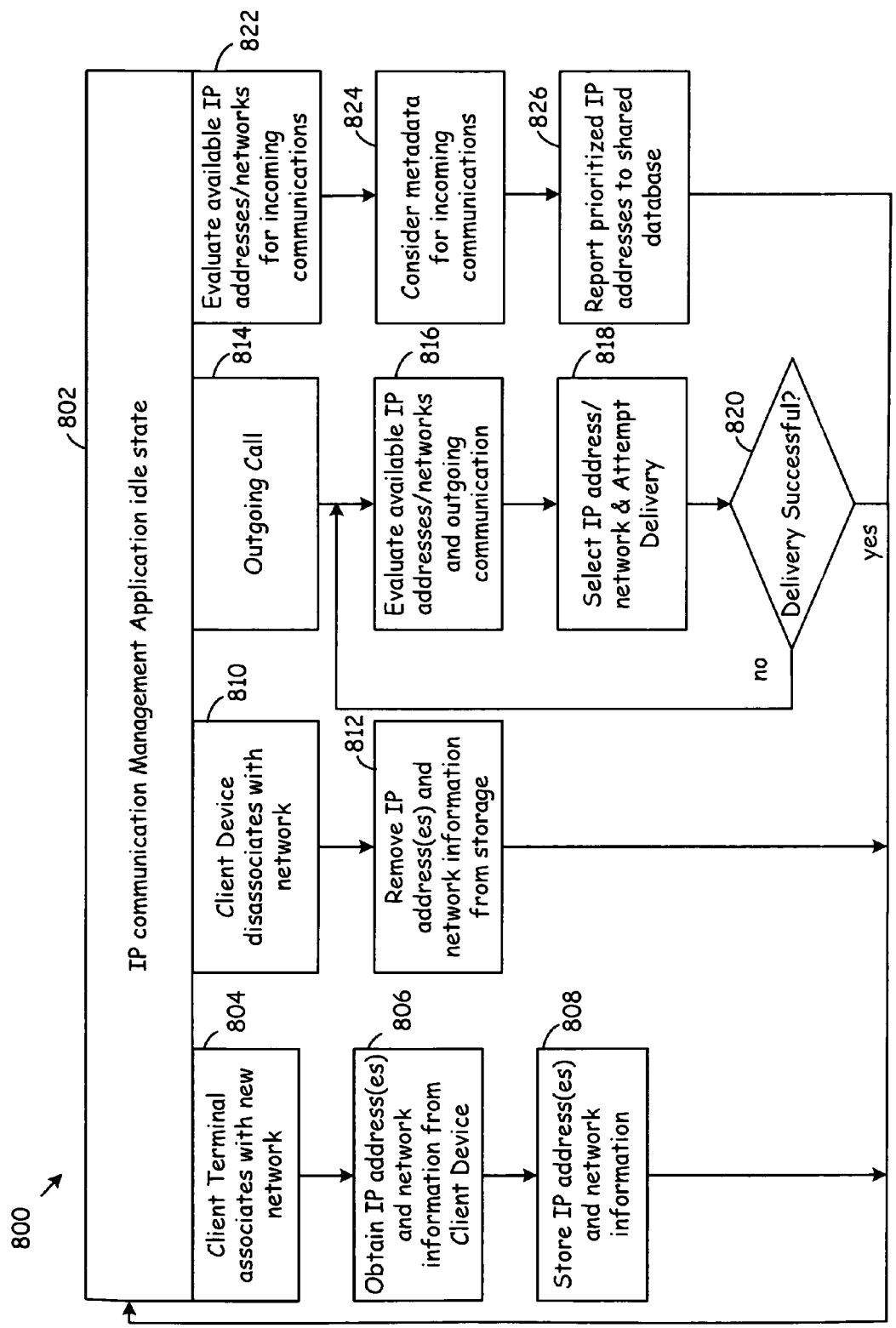
FIG. 11 provides a logic flow diagram describing an IP communication management application from a third party database.

FIG. 11 is a flow chart in accordance with an embodiment of the present invention. Operations 800 may be performed by a software application operating on a client terminal or server within the service provider. This application is operable to manage all available communication resources for the client terminal. For example, when the client terminal supports multiple network types, e.g., Bluetooth, WLAN, and LAN, this application keeps track of all of available network based communications. When client terminal example 102, associates with an access point, as was described with reference to FIG. 1, this network may provide a unique IP address to client terminal 102. The application running on the client terminal knows the IP addresses of each of the available network IP pathway options. The client application may also be operable to collect statistics related to each network connection. For example, data related to the performance of the connection, bandwidth of the connection, and the costs associated with the connection may be monitored using the client application. Then, based on all of the previously identified and collected information, when a particular task requires an IP pathway, the application assigns one of the pathways for the transaction. This information may also be reported to the shared database in order to manage incoming communications. The client application may, after priorities assigned to various IP addresses within the shared database, define the priorities of network addresses reported as being available to the shared database. This may be done based on the network capabilities, terminal capabilities, communication capabilities, and/or user input. For example, in a low bandwidth environment, the client application may assign a higher priority to a network address associated with a text messaging communication pathway rather than a voice communication or audio/visual communication pathway. This is because insufficient bandwidth is available to support these more robust communications. Alternatively, a user may direct, through the user interface or keypad of the client terminal, that only text communications should be received or that the device be placed in a privacy mode where text communications or voice communications are routed to an appropriate mailbox. In this way, the client application not only manages the routing of outgoing communications, but may also manage the routing of incoming communications.

Operations 800 of FIG. 11 commence with the IP communication management application operating in an idle state in step 802. From step 802, the client terminal may associate with a new network in step 804. In the association, the client terminal will receive an IP address and network information from a servicing access point or network. In response thereto, the IP communication management application obtains such IP addresses and network information from the client device in step 806. The IP communication management application will then store the IP addresses and network information received for the particular IP pathway in step 808. From step 808, operation returns to step 802. In another operation, the client device disassociates with a particular network in step 810. In such case, the IP communication management application removes the IP address or addresses associated with the network and the network information from storage in step 812. From step 812, operation returns to step 802.

In another operation, the client terminal desires to establish communications in step 814, (e.g., to a destination client terminal). In response thereto, the IP communication management application evaluates the type of communication desired and the available IP addresses and networks with which the client terminal is associated in step 816). Based upon this evaluation, the IP communication management application selects an IP address and a network for the packet data communication transmission and attempts delivery via the selected IP pathway in step 818. If delivery is not successful (as determined at step 820), operation returns to step 816. However, if the delivery is successful as determined at step 820, operation returns to step 802.

To support incoming communications, the client application is operable to evaluate the available IP addresses and networks in step 822. In step 824, user preferences will be considered for the prioritization of IP addresses for incoming communications. In step 826, the prioritized IP addresses and metadata associated with communication types and the various capabilities of the terminal network and communications are reported to the shared database such that the client application manages not only outgoing communications but incoming communications as well With operations 800 of FIG. 11, the IP communication management application may consider the data type for incoming and outgoing communications, a latency of each IP pathway, the cost of each IP pathway, and other relevant IP pathway considerations. For example, for some packet data servicing, the IP communication management application may select a low cost IP, high latency IP pathway for some type of communication, such as low priority text only, while selecting a low latency, high cost IP pathway for other types of packet data, such as voice or audio/visual communications. The IP communication management application may also select a particular IP path for packet data transmission based upon the network operational parameters of the available networks associated with the client terminal. For example, the IP communication management application may evaluate the traffic loading of the various available IP pathways prior to selecting an IP pathway for a particular packet data communication.

Figure 12:
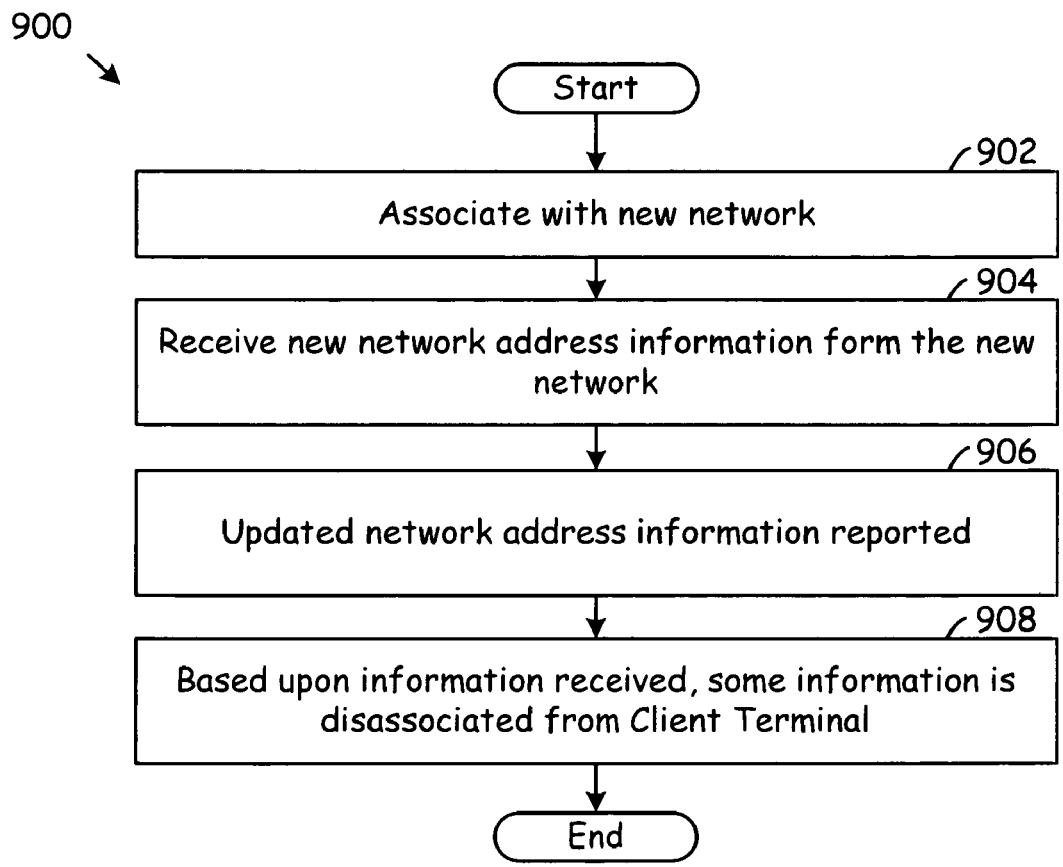
FIG. 12 provides a logic flow diagram describing how an individual client terminal may update network address information to a service provider or third party database in accordance with one or more embodiments of the present invention.

Operations 900 of FIG. 12 are particularly useful when the client terminal is mobile. Due to mobility, when a client terminal associates with a new network in steps 902 and 904, the client terminal may be outside the communication range of other previously associated networks. The prior addressing information may have become stale. Based on the current information, a previously associated address may be disassociated from the client terminal based upon the fact that the client terminal is now associated with a new network. In such case, a previously associated address may have a rules set that will automatically disassociate from the client terminal in step 906. This ensures that prior data that conflicts with current data is removed. Such operations prevent communication from being directed to stale or latent addresses by removing this stale information from the shared database. This improves the likelihood of establishing communications through those network pathways in a timely manner.

In summary, the present invention provide a network infrastructure operable to support the exchange of communications, such as voice communications, between a first client terminal having a first user identifier and a second (destination) client terminal associated with a second user identifier (handle). This second client terminal may be part of a family of client terminals. The network infrastructure includes a packet-switch network, a shared database and a number of client terminals serviced by one or more service providers. These terminals include a network interface and are identified by their service provider by a network address. The shared database associates user identifiers, metadata and network addresses. This allows a user to access the shared database in order to initiate a call request from the first client terminal to the second client terminal(s). The first client terminal receives the network address or vectoring information on the network address of the destination terminal through the shared database. This shared database may also have metadata used to manage the call. The destination terminal may receive or redirect the call within the family of client terminals based on metadata contained within the shared database or stored locally.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As one of average skill in the art will appreciate, the term "communicatively coupled", as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A client terminal configured to support network based communications to a family of client terminals, the client terminal comprising:
   a host processing circuit;
   an internal memory accessible to the host processing circuitry;
   a user interface coupled to the host processing circuit, wherein the user interface captures and presents user communications;
   at least one network interface, coupled to the host processing circuit, wherein the at least network interface couples the client terminal to at least one servicing network;
   wherein the client terminal is within the family of client terminals, and each client terminal within the family of client terminals stores client handle, metadata used to manage the network based communication delivery within the family of client terminals, including likelihood of user proximity to the client terminal information, and network address information associated with each client terminal within the family of client terminals; and
   wherein a visual call announcement is delivered by all client terminals within the family of client terminals, and an audible call announcement is delivered to a client terminal within the family of client terminals having a likelihood of user proximity above a predetermined threshold.

2. The client terminal of claim 1, wherein the client terminal is to associatively store client handle, metadata and network address information associated with each client terminal within the family of client terminals to a shared database accessible through the at least one servicing network.

3. The client terminal of claim 1, wherein the network based communication is at least initially delivered to the client terminal within the family of client terminals having the greatest likelihood of user proximity to the client terminal.

4. The client terminal of claim 1, wherein the client terminal is operable to deliver a network based communication to a second client terminal within the family of client terminals by proxy.

5. The client terminal of claim 1, wherein information associated with the client terminals accepting the network based communication is updated to the shared database.

6. The network infrastructure of claim 1, wherein the network based communication is a Voice over Internet Protocol (VoIP) call.

7. The network infrastructure of claim 1, wherein the network based communication comprises text, and/or audio and video communications.

8. A network infrastructure supporting call exchange between a first client terminal having a first client handle and a family of second client terminals associated with at least one second client handle, the network infrastructure comprising:
   a packet switched network communicatively coupled to both the first client terminal and the family of second client terminals;
   a shared database communicatively coupled to the packet switched network, wherein the shared database associates client handles, network address information and metadata;
   the first client terminal comprising a first network interface that has at least one first network address;

the family of second client terminals each comprising a second network interface, wherein each second client terminal has at least one second network address;

the family of second client terminals associatively stores the second client handle, metadata, and network addresses within the shared database;

the first client terminal retrieves the network addresses and metadata associated with the second client handle from the database using the second client handle;

the first client terminal establishes a call with the family of second client terminal(s) using the retrieved network addresses associated with the second client handle, and wherein the metadata is used to manage the call delivery to the plurality of second client terminals;

wherein:

the metadata comprises likelihood of user proximity to the client terminal information;

the user is associated with the second client handle;

the call is at least initially delivered to the second client terminal(s) having the greatest likelihood of user proximity;

an audible call announcement is delivered by the second client terminal(s) having a likelihood of user proximity above a predetermined threshold; and a visual call announcement is delivered by all client terminals within the family.

9. The network infrastructure of claim 8, wherein the client handle comprises:
a service provider identifier; and
a user identifier.

10. The network infrastructure of claim 8, wherein information associated with the second client terminal(s) accepting the call is updated to the shared database.

11. The network infrastructure of claim 8, wherein the packet switched network is the Internet.

12. The network infrastructure of claim 8, wherein the call is a Voice over Internet Protocol (VoIP) call.

13. The network infrastructure of claim 8, wherein the call comprises text communications.

14. The network infrastructure of claim 8, wherein the call comprises audio and video communications.

15. The network infrastructure of claim 8, wherein the first client terminal is serviced by a first service provider and the plurality of second client terminals is serviced by a second service provider.

16. A method to support call setup between a source client terminal having a first client handle and a destination client terminal within a family of client terminals, wherein a second client handle is associated with the family of client terminals, the method comprising:

receiving, by the source client terminal, a call setup request from a user;

accessing, by the source client terminal, a shared database in response to the receipt of the call setup request using a destination identifier to retrieve at least one network routing address associated with the second client handle, wherein the network routing address is within the family of client terminals;

attempting, by the source client terminal, to establish a call using the network routing addresses retrieved, wherein the family of client terminals attempts to deliver the call; and wherein a client terminal within the family of client terminals and having a likelihood of user proximity above a predetermined threshold delivers an audible call announcement, and all client terminals within the family deliver a visual call announcement.

17. The method of claim 6, wherein the family of client terminals proxies the call from a first client terminal having a first network routing address to a second client terminal having a second network routing address, and wherein the first client terminal and second client terminal are within the family of client terminals.

18. The method of claim 16, wherein the family of client terminals is operable to redirect the call from a first client terminal associated with the retrieved network routing address to a second client terminal having a second network routing address.

19. The method of claim 16, further comprising populating the shared database with associations between network routing addresses, destination identifiers, and metadata.

20. The method of claim 16, further comprising:
accessing, by the source client terminal, the shared database in response to the receipt of the call setup request using a destination identifier to retrieve metadata; and
managing the call based on the metadata.

21. The method of claim 16, wherein the call is a Voice over Internet Protocol (VoIP) call.

22. The method of claim 16, wherein the call comprises audio and video communications.

23. The method of claim 16, wherein the call comprises text communications.

24. The method of claim 16, wherein the source client terminal is serviced by a first service provider and the destination client terminal being serviced by a second service provider.

25. A network telephony infrastructure supporting a call destined for a recipient having a handle, the network telephony infrastructure comprising:

a packet switched network;

an initiating telephony device that initiates the call destined for the recipient via the packet switched network;

a first recipient telephony device, communicatively coupled to the packet switched network, that has a first identifier associated with the packet switched network;

a second recipient telephony device, communicatively coupled to the packet switched network, that has a second identifier associated with the packet switched network;

a database that stores and associates the first handle with both the first identifier and the second identifier;

the initiating telephony device retrieves at least one of the first identifier and the second identifier from the database using the first handle;

the initiating telephony device uses the at least one of the first identifier and the second identifier retrieved from the database to initiate the call;

wherein the first recipient telephony device and the second recipient telephony device are members of a family of telephony devices; and wherein in response to a telephony device that is a member of the family of telephony devices receiving a call, a telephony device having a likelihood of user proximity above a predetermined threshold delivers an audible call announcement, and all telephony devices that are members of the family of telephony devices deliver a visual call announcement.

26. The network telephony infrastructure of claim 25, wherein the database also stores at least one piece of related metadata, and the at least one piece of related metadata is used to select between the first identifier and the second identifier for the initiation of the call.

27. The network telephony infrastructure of claim 26, wherein the at least one piece of related metadata comprising information about the recipient.

28. The network telephony infrastructure of claim 26, wherein the at least one piece of related metadata comprising information about the first recipient telephony device.

29. The network telephony infrastructure of claim 28, wherein the at least one piece of related metadata further comprising information about the second recipient telephony device.

30. The network telephony infrastructure of claim 26, wherein the initiating telephony device selects between the first identifier and the second identifier for the initiation of the call based on the at least one piece of related metadata.

31. The network telephony infrastructure of claim 26, further comprising a server, communicatively coupled to the packet switched network, that selects between the first identifier and the second identifier for the initiation of the call based on the at least one piece of related metadata.

32. A network telephony infrastructure supporting a first call destined for a first recipient having a first handle and a second call destined for a second recipient having a second handle, the network telephony infrastructure comprising:

a packet switched network;

a first initiating telephony device, communicatively coupled to the packet switched network, that initiates the first call destined for the first recipient;

a second initiating telephony device, communicatively coupled to the packet switched network, that initiates the second call destined for the second recipient;

a first recipient telephony device, communicatively coupled to the packet switched network, that has a first network identifier associated with the packet switched network;

a second recipient telephony device, communicatively coupled to the packet switched network, that has a second network identifier associated with the packet switched network;

a database that stores and associates the first handle with both the first network identifier and the second network identifier, and stores and associates the second handle with the second network identifier;

the first initiating telephony device interacts with the database using the first handle, and initiates the first call based on a selected one of the first network identifier and the second network identifier; and the second initiating telephony device interacts with the database using the second handle, and initiates the second call based on the second network identifier;

wherein the first recipient telephony device and the second recipient telephony device are members of a family of telephony devices; and wherein in response to a telephony device that is a member of the family of telephony devices receiving a call, a telephony device having a likelihood of user proximity above a predetermined threshold delivers an audible call announcement, and all telephony devices that are members of the family of telephony devices deliver a visual call announcement.

33. The network telephony infrastructure of claim 32, wherein the database also stores at least one piece of metadata, and the at least one piece of metadata is used for the selection of the one of the first identifier and the second identifier for the first call.

34. The network telephony infrastructure of claim 33, wherein the at least one piece of metadata comprising information about the first recipient.

35. The network telephony infrastructure of claim 33, wherein the at least one piece of metadata comprising information about the first recipient telephony device.

* * * * *